UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

SILICON PRODUCTS.

1,028,303.   Specification of Letters Patent.   Patented June 4, 1912.

No Drawing.   Application filed March 4, 1912. Serial No. 681,623.

*To all whom it may concern:*

Be it known that I, FRANK J. TONE, of Niagara Falls, Niagara county, and State of New York, have invented a new and useful Improvement in Silicon Products, of which the following is a full, clear, and exact description.

My invention relates to a new and valuable product composed essentially of silicon, oxygen and carbon. The product is a sublimation or condensation product made in an electric furnace operated with a mixture of silica and carbon.

In making the product herein claimed, I prefer to use a charge consisting of 35 parts by weight of powdered coke, 54 parts by weight silica sand and 7 parts by weight of sawdust. This charge is placed in a granular core resistance furnace, preferably of the type well known in the manufacture of silicon carbid and shown in U. S. Patent No. 560291, issued May 19, 1896. The charge surrounds the horizontal core, which extends from one terminal of the furnace to the other, and by means of which core it is possible to heat the surrounding charge to any desired temperature up to the point where silicon carbid is dissociated. In connection with this resistance furnace, I provide in close proximity to it and communicating with the core and zone of mixture immediately in contact with the core, a condensation chamber having walls provided with suitable refractory material, preferably silicon carbid. The condensation chamber is closed to the outside air and communicates only with the atmosphere of the furnace, so that the gases and gaseous products, which form or are present in the zone next to the core, can enter said chamber.

The furnace is operated as a normal silicon carbid furnace, and the operation is not only carried to the point where silicon carbid is formed around the core, but is continued until some silicon carbid is decomposed, liberating silicon in volatilized form. The atmosphere of the reaction zone of the furnace consists of carbon monoxid, silica and probably silica in reduced form as silicon or silicon monoxid.

A condensation product having very valuable properties, is formed in the condensation chamber under the above named conditions, and is described as follows: It has light green, greenish white or gray white color. It has a soft felt-like and pliant structure and a resiliency or elasticity like felt, due probably to its short fibrous texture. Its apparent density is variable, but is always very low being approximately 0.15 and its real density is about 2.3. It is not acted upon by any of the mineral acids; however, hydrofluoric acid acts upon it, dissolving silica and leaving a residue, which is essentially a solid solution of silicon carbid in silica. The loss of silica by treating with the hydrofluoric acid may vary between 65% and 80% of the total material. A typical analysis is as follows: carbon 6.45%, silicon 49.95%, oxygen 43.60%. Oxids of iron aluminum and calcium may be present in small amounts. The material is very refractory and withstands a temperature of 1700° C. without sign of fusion. Treated with pure oxygen at this temperature it is converted into silica. As the product has a very high thermal resistivity and due to its refractory nature it is very valuable as a heat insulating material. On account of its fine texture it will form an efficient material for air or gas filtration. It may also be used as an abrasive or polishing material.

Without prejudice to any rights under this invention, the inventor makes the following statement of his belief in regard to the material and its mode of production. The product is believed to be a mixture of silica and a solid solution of silicon carbid in silica. The products from the reaction zone of the furnace are silica, carbon monoxid and reduced silica, the latter being silicon or silicon monoxid. The reduced silica and carbon monoxid react forming silica and silicon carbid and as these are produced they form a solid solution. At the same time silica vapor exists in the furnace and the resulting product is a mixture of the solid solution of silica and silicon carbid and silica. On account of its method of formation the chemical composition of the product may vary between very wide limits, as the composition of the solid solution varies with the relative proportions of silicon and silicon monoxid in the reaction zone, and the percentage of silica vapor depends on the furnace temperature. Consequently it can be seen that, by changing the composition of the furnace charge and the operating conditions of the furnace, the atmosphere in the reaction zone of the furnace will necessarily vary and consequently yield condensation products of varying chemical compositions, which influence the specific gravity of the material and certain other physical properties; but it is always characterized by its peculiar structure and the fact that it is a mixture of silica with another product which is apparently the solid solution of silica in silicon carbid.

I claim:

1. A silicon-oxygen-carbon product of felt-like texture having an approximate apparent density of 0.15 and a real density of about 2.3.

2. A silicon-oxygen-carbon product of felt-like texture, having an approximate apparent density of 0.15, a real density of about 2.3 and characterized by high thermal resistivity and refractability.

3. A refractory condensation product, consisting of silicon-oxygen and carbon in the proportion of approximately 50 parts of silicon, 44 parts of oxygen and 6 parts of carbon, having an approximate apparent density of 0.15, a real density of about 2.3, a pliant felt-like structure and being a poor conductor of heat.

4. A refractory condensation product of silica and a solid solution of silicon carbid and silica, characterized by a real density of 2.3, a pliant felt-like structure and having a high thermal resistivity.

5. A silicon-oxygen-carbon condensation product of a greenish or gray white color having a felt-like pliant structure.

In testimony whereof, I have hereunto set my hand.

FRANK J. TONE.

Witnesses:
J. I. RAFUSE,
EARLE H. FINNEGON.